United States Patent
Tamaki (10) Patent No.: US 8,196,698 B2
(45) Date of Patent: Jun. 12, 2012

(54) MOTOR-DRIVEN POWER STEERING APPARATUS

(75) Inventor: Akihiro Tamaki, Tochigi (JP)

(73) Assignee: Showa Corporation, Saitama (JP)

( * ) Notice: Subject to any disclaimer, the term of this patent is extended or adjusted under 35 U.S.C. 154(b) by 891 days.

(21) Appl. No.: 11/849,319

(22) Filed: Sep. 3, 2007

(65) Prior Publication Data

US 2008/0230302 A1 Sep. 25, 2008

(30) Foreign Application Priority Data

Mar. 23, 2007 (JP) ................................. 2007-076216

(51) Int. Cl.
*B62D 5/04* (2006.01)
(52) U.S. Cl. .................... 180/444; 180/446; 318/471
(58) Field of Classification Search .................. 318/641, 318/806, 708, 473, 472, 471, 452, 445, 634; 324/105; 180/444, 446
See application file for complete search history.

(56) References Cited

U.S. PATENT DOCUMENTS

| | | | | |
|---|---|---|---|---|
| 3,205,405 A | * | 9/1965 | Resh, Jr. .......................... | 361/27 |
| 4,525,763 A | * | 6/1985 | Hardy et al. .................... | 361/24 |
| 4,611,682 A | * | 9/1986 | Yasuda et al. .................. | 180/446 |
| 4,771,845 A | * | 9/1988 | Shimizu ........................ | 180/446 |
| 4,849,677 A | * | 7/1989 | Kruger .......................... | 318/473 |
| 4,977,507 A | * | 12/1990 | Matsuoka et al. .............. | 701/43 |
| 6,326,753 B1 | * | 12/2001 | Someya et al. ................ | 318/471 |
| 6,690,138 B2 | * | 2/2004 | Kaji et al. ...................... | 318/783 |
| 6,900,607 B2 | * | 5/2005 | Kleinau et al. ................ | 318/432 |
| 7,071,649 B2 | * | 7/2006 | Shafer et al. .................... | 318/783 |
| 7,322,438 B2 | * | 1/2008 | Hayashi ........................ | 180/272 |
| 7,471,003 B2 | * | 12/2008 | Kobayashi et al. ......... | 290/40 C |
| 7,576,506 B2 | * | 8/2009 | Kleinau et al. ................ | 318/471 |
| 7,583,041 B2 | * | 9/2009 | Yamaguchi et al. .......... | 318/471 |
| 2009/0200098 A1 | * | 8/2009 | Inoue et al. .................... | 180/446 |

FOREIGN PATENT DOCUMENTS

JP 60-35663 2/1985
JP 2004082757 A * 3/2004

* cited by examiner

*Primary Examiner* — Paul N Dickson
*Assistant Examiner* — Wesley Potter
(74) *Attorney, Agent, or Firm* — Babcock IP, PLLC (57) ABSTRACT

The invention provides a motor-driven power steering apparatus provided with a fault diagnosing apparatus diagnosing a fault of a board temperature detecting apparatus on the basis of an armature current Im detected by a motor current detecting apparatus and a board temperature Tb of the control board detected by the board temperature detecting apparatus, and a target current suppressing apparatus suppressing a target current Iq at a time when the fault diagnosing apparatus diagnoses that the board temperature detecting apparatus is out of order.

24 Claims, 10 Drawing Sheets

MOTOR-DRIVEN POWER STEERING APPARATUS

BACKGROUND OF THE INVENTION

1. Field of the Invention

The present invention relates to a motor-driven power steering apparatus, and more particularly relates to fault diagnosis of a temperature sensor of the motor-driven power steering apparatus used for temperature compensation of a drive motor or the like.

2. Description of the Related Art

In a motor-driven power steering apparatus used as a drive source assisting a steering operation, since the motor-driven power steering apparatus is arranged within an engine room in which an internal combustion engine is arranged and a heat is generated, and the motor itself generates heat, a temperature of the motor is widely variable.

Particularly, if the temperature of the motor is increased so as to become equal to or higher than a predetermined temperature, there is a risk that the motor and a motor drive circuit may be thermally damaged. Accordingly, there has been proposed an example (for example, refer to Japanese Patent Application Laid-Open No. 60-035663 (patent document 1)) in which an operating amount of a motor is reduced in the case that a temperature of the motor is detected and becomes equal to or higher than an allowable value.

In the patent document 1 mentioned above, the temperature of the motor is determined on the basis of an ambient temperature detected by a thermistor arranged near the motor and a temperature increase by driving the motor. Accordingly, if a fault is generated in the thermistor itself, there can be generated a matter that the detected motor temperature is equal to or lower than the allowable value and the operating amount of the motor is not reduced even though the temperature of the motor is actually more than the allowable value, whereby the motor and the motor drive circuit is thermally damaged.

SUMMARY OF THE INVENTION

The present invention is made by taking the point mentioned above into consideration, and an object of the present invention is to provide a motor-driven power steering apparatus in which thermal damage of a motor and a motor drive circuit is securely prevented by diagnosing a fault of a temperature detecting apparatus and suppressing a motor drive at a time of diagnosing a fault.

The present invention relates to a motor-driven power steering apparatus provided with a target current computing means calculating a target current on the basis of a steering torque, and assisting a human power by controlling so as to drive a motor in accordance with the target current, comprising: a board temperature detecting apparatus detecting a board temperature of a control board; a motor current detecting means detecting an armature current of the motor; a fault diagnosing means diagnosing a fault of the board temperature detecting apparatus on the basis of the armature current detected by the motor current detecting means and the board temperature detected by the board temperature detecting apparatus; and a target current suppressing means suppressing the target current at a time when the fault diagnosing means diagnoses that the board temperature detecting apparatus is out of order.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

A description will be given below of an embodiment in accordance with the present invention with reference to FIGS. 1 to 11.

Figure 1:
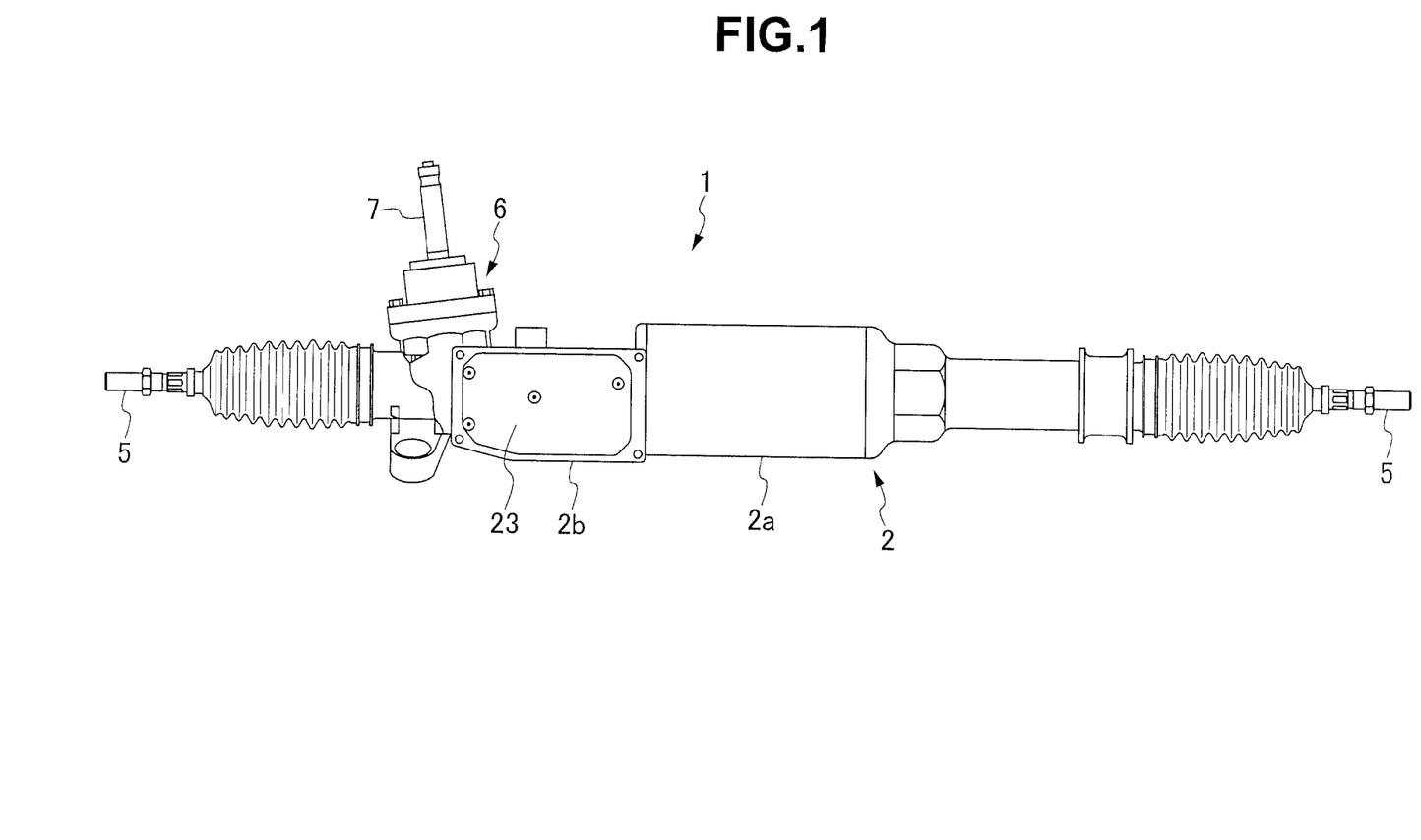
FIG. 1 is a front elevational view of a whole of a motor-driven power steering apparatus in accordance with an embodiment in accordance with the present invention.
Figure 2:
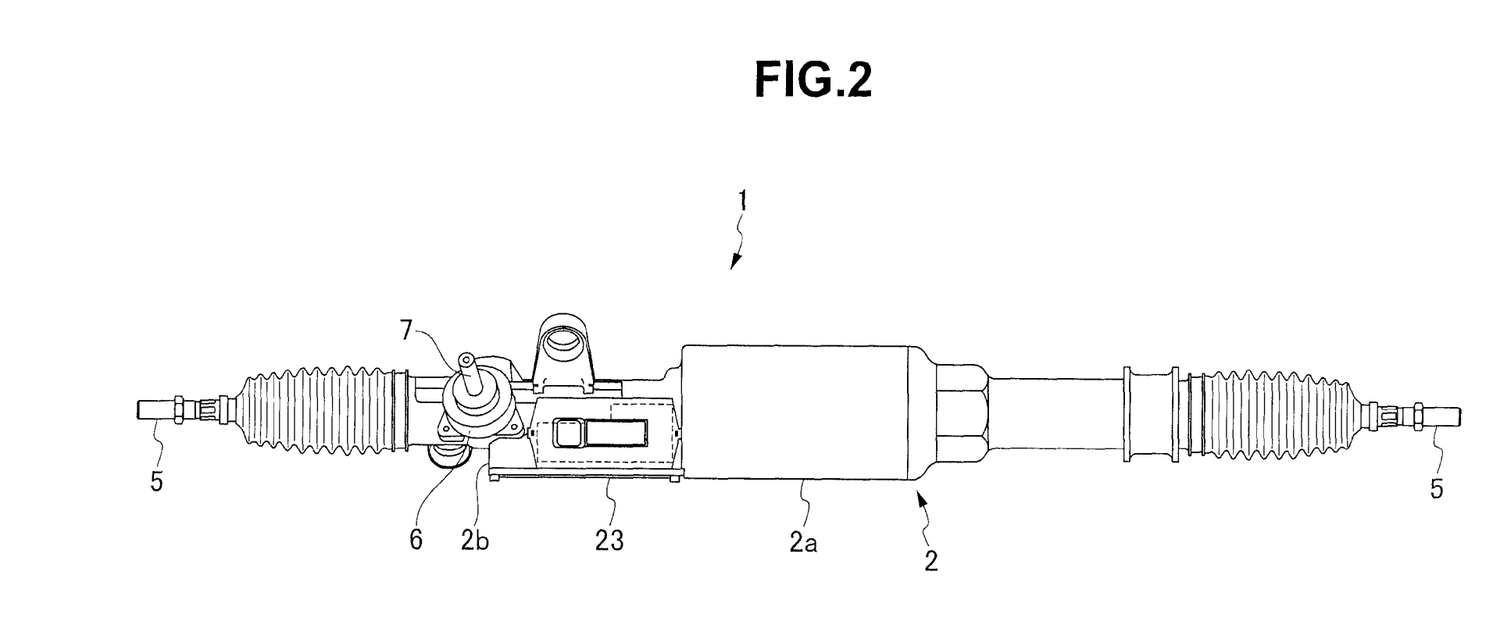
FIG. 2 is a plan view of the same.
Figure 3:
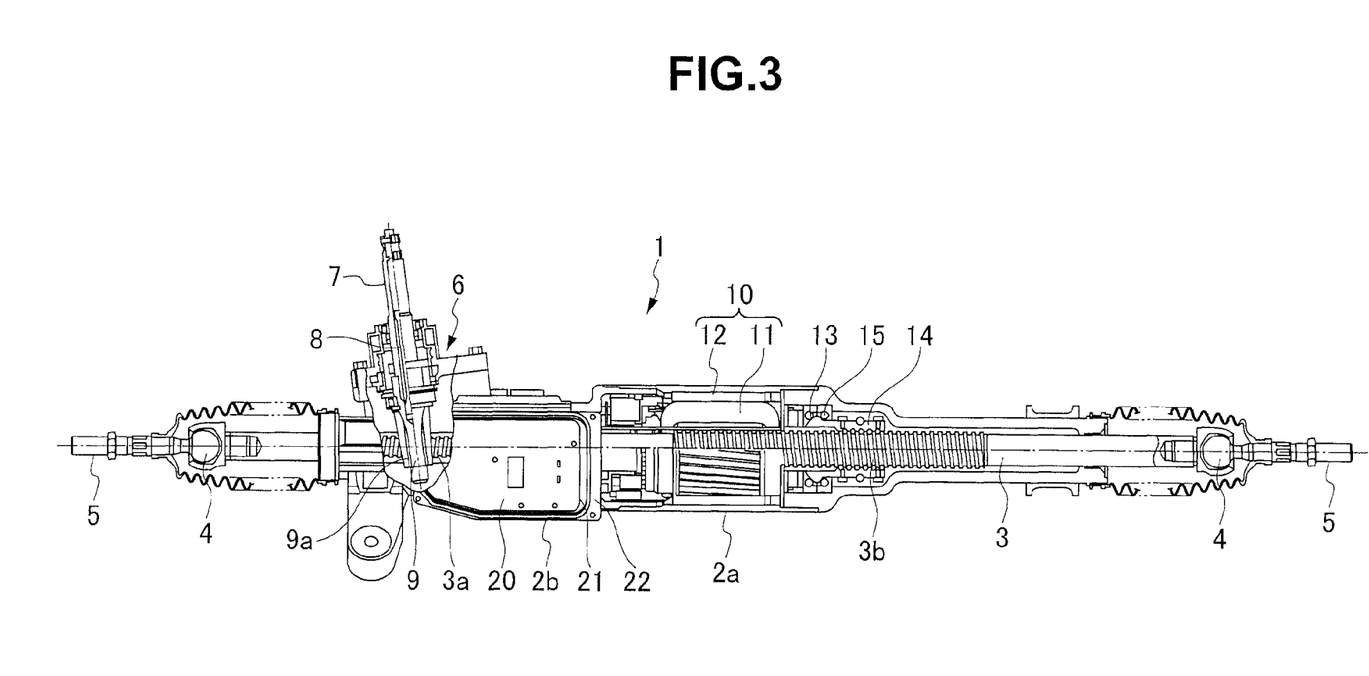
FIG. 3 is a partly omitted front elevational view showing an internal structure of the motor-driven power steering apparatus.

A front elevational view of a whole of a motor-driven power steering apparatus 1 in accordance with the present embodiment is shown in FIG. 1, a top elevational view is shown in FIG. 2, and a front elevational view showing an internal structure of the same is shown in FIG. 3.

The motor-driven power steering apparatus 1 is structured such that a rack shaft 3 is accommodated within an approximately cylindrical rack case 2 directed to a lateral direction (light and left sides are inversely shown in FIGS. 1, 2 and 3) of a vehicle so as to be slidable in a lateral axial direction.

The rods 5 and 5 are moved to both end portions of the rack shaft 3 protruding from openings in both ends of the rack case 2 respectively joints 4 and 4, and steered wheels of the vehicle are steered via a steering mechanism.

A steering gear box 6 is provided near a right end (a left end in FIGS. 1 to 3) of the rack case 2.

An input shaft 7 coupled to a steering shaft to which a steering wheel (not shown) is integrally attached, via a joint is rotatably pivoted to the steering box 6 via a bearing, and the input shaft 7 is coupled to a steering pinion shaft 9 so as to be relatively twistable via a torsion bar 8 within the steering gear box 6.

A helical tooth 9a of the steering pinion shaft 9 is engaged with a rack tooth 3a of the rack shaft 3, whereby a rack and pinion mechanism is structured.

Accordingly, a steering force transmitted to the input shaft 7 in accordance with a rotating operation of the steering wheel rotates the steering pinion shaft 9 via the torsion bar 8 so as to slide the rack shaft 3 in the lateral axial direction on the basis of an engagement between the helical tooth 9a of the steering pinion shaft 9 and the rack tooth 3a.

On the other hand, an expanded center portion of the rack case 2 forms a motor case 2a, and a motor 10 is accommodated therein.

The motor 10 is provided such that an annular inner rotor 11 rotates on an outer periphery of the rack shaft 3 on which a ball thread 3b is inscribed, and an outer stator 12 is circumferentially provided in the motor case 2a in an outer side of the inner rotor 11.

A connection sleeve 13 pressure inserted to an inner peripheral surface of the annular inner rotor 11 extends to a left side (a right side in FIG. 3), and is integrally connected to a ball nut member 14 rotatably supported to an inner periphery of the motor case 2a via a bearing 15.

The ball nut member 14 is engaged with the ball thread 3b of the rack shaft 3 via a ball.

Accordingly, if the motor 10 is driven and the inner rotor 11 is rotated, the ball nut member 14 is integrally rotated, and it is possible to slide the rack shaft 3 screwed with the ball nut member 14 via the ball right and left so as to assist a steering force.

The housing 2b accommodating a control board 20 controlling so as to drive the motor 10 in a portion between the motor case 2a of the rack case 2 and the steering gear box 6 is formed in a front side (a pinion shaft side) of the rack shaft 3.

The motor case 2a and the steering gear box 6 are both adjacent to the housing 2b, form a common space together with the housing 2b, and has a small-sized compact structure.

Accordingly, the motor 10 and the control board 20 are accommodated so as to be adjacent to a part (the adjacent motor case 2a and housing 2b) of the rack case 2.

The housing 2b has a generally rectangular front surface opening 21 which is larger toward a front side, a mating face 22 to which a front surface cover 23 closing the opening 21 is attached, is formed in a peripheral edge thereof so as to form a rectangular frame shape, and the front cover 23 is screwed to the mating face 22 via a seal member.

The control board 20 is attached to a leading end surface of a plurality of mounting bosses formed so as to protrude from a bottom surface opposed to the opening 21 of the housing 2b, and a front side thereof is covered by the front surface cover 23.

On the other hand, a torque sensor 30 is provided around the torsion bar 8 within the steering gear box 6.

Figure 4:
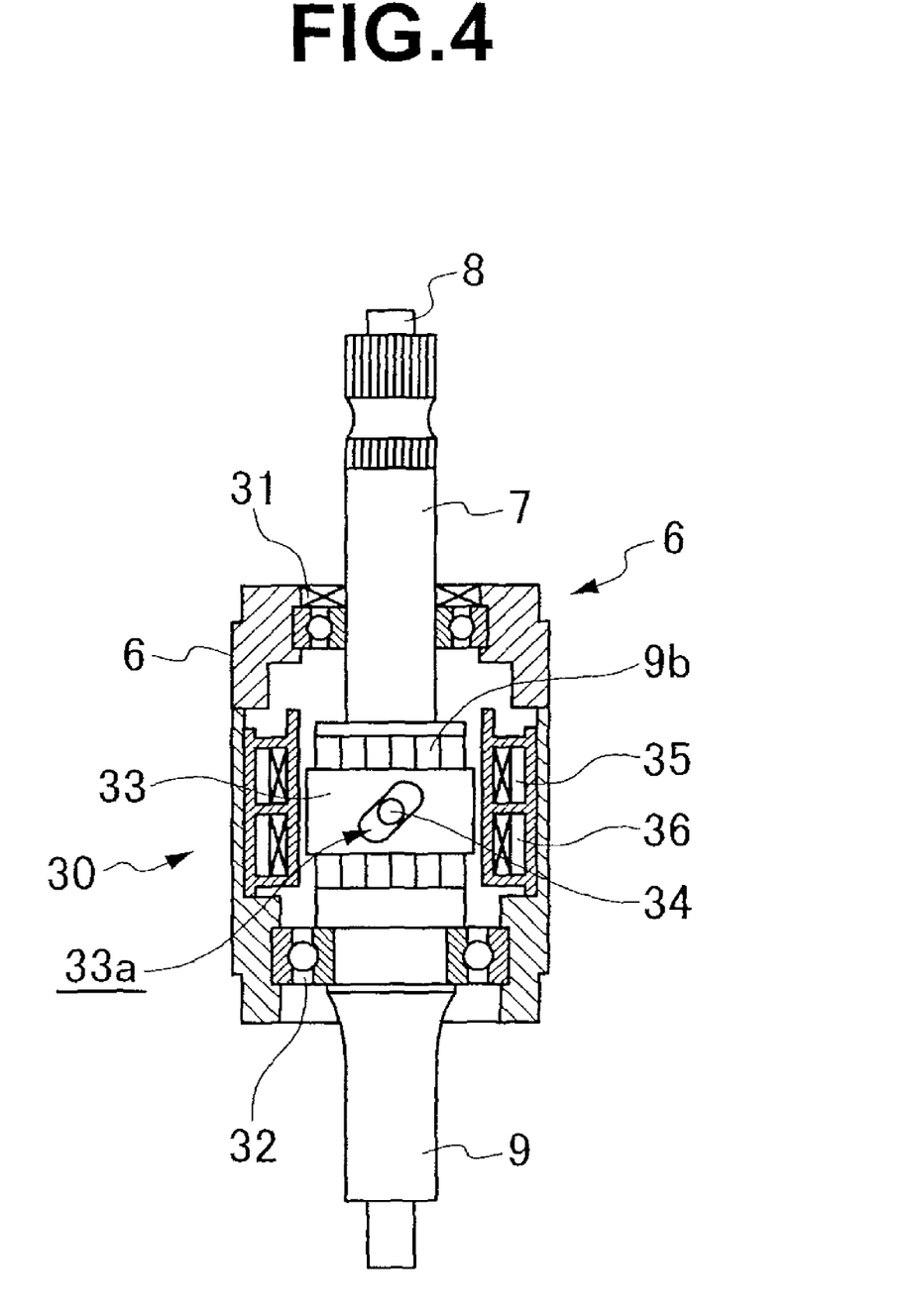
FIG. 4 is a schematic view of an outline structure of a torque sensor.

A schematic view of an outline structure of the torque sensor 30 is shown in FIG. 4.

The input shaft 7 and the steering pinion shaft 9 are rotatably supported via bearings 31 and 32, are coaxially inserted into the steering gear box 6, and are connected by a torsion bar 8 therein as described above.

A cylindrical core 33 is fitted onto a serrated outer peripheral surface of a large-diameter end portion 9a of the steering pinion shaft 9, and is provided so as to be slidable in only an axial direction with respect to the steering pinion shaft 9. A slider pin 34 projected from the input shaft 7 is fitted into a spiral groove 33a of the core 33 in a circumferential direction of the large-diameter end portion 9a through a long slot.

Two torque detecting coils 35 and 36 supported in the steering gear box 6 are provided at an outer periphery of the cylindrical core 33 and are slidable along an axial direction via a space.

These two coils 35 and 36 are arranged at a side opposite each other with respect to the center of the axial direction of the core 33.

When a torsional stress acts on the input shaft 7, a rotating force is transmitted to the steering pinion shaft 9 via the torsion bar 8, and then, the torsion bar 8 is elastically deformed. As a result, a relative displacement of a rotating direction is generated between the input shaft 7 and the steering pinion shaft 9.

The relative displacement of the rotating direction slides the core 33 to the axial direction by an engagement of the slider pin 34 and the spiral groove 33a.

When the core 33 is moved to the axial direction, each area of the coils 35 and 36 surrounding the core 33 varies, and there is a relation such that when an area of one coil surrounding the core 33 increases, an area of the other coil surrounding the core 33 decreases.

When the area surrounding the core 33 increases, a magnetic loss increases; therefore, inductance of the coil decreases. Conversely, when the area surrounding the core 33 decreases, a magnetic loss decreases; therefore, inductance of the coil increases.

Accordingly, in the case where a torque of moving the core 33 to the coil 35 side acts, an inductance L1 of the coil 35 decreases, and an inductance L2 of the coil 36 increases. Conversely, in the case where a torque of moving the core 33 to the coil 36 side acts, an inductance L1 of the coil 35 increases, and an inductance L2 of the coil 36 decreases.

Figure 5:
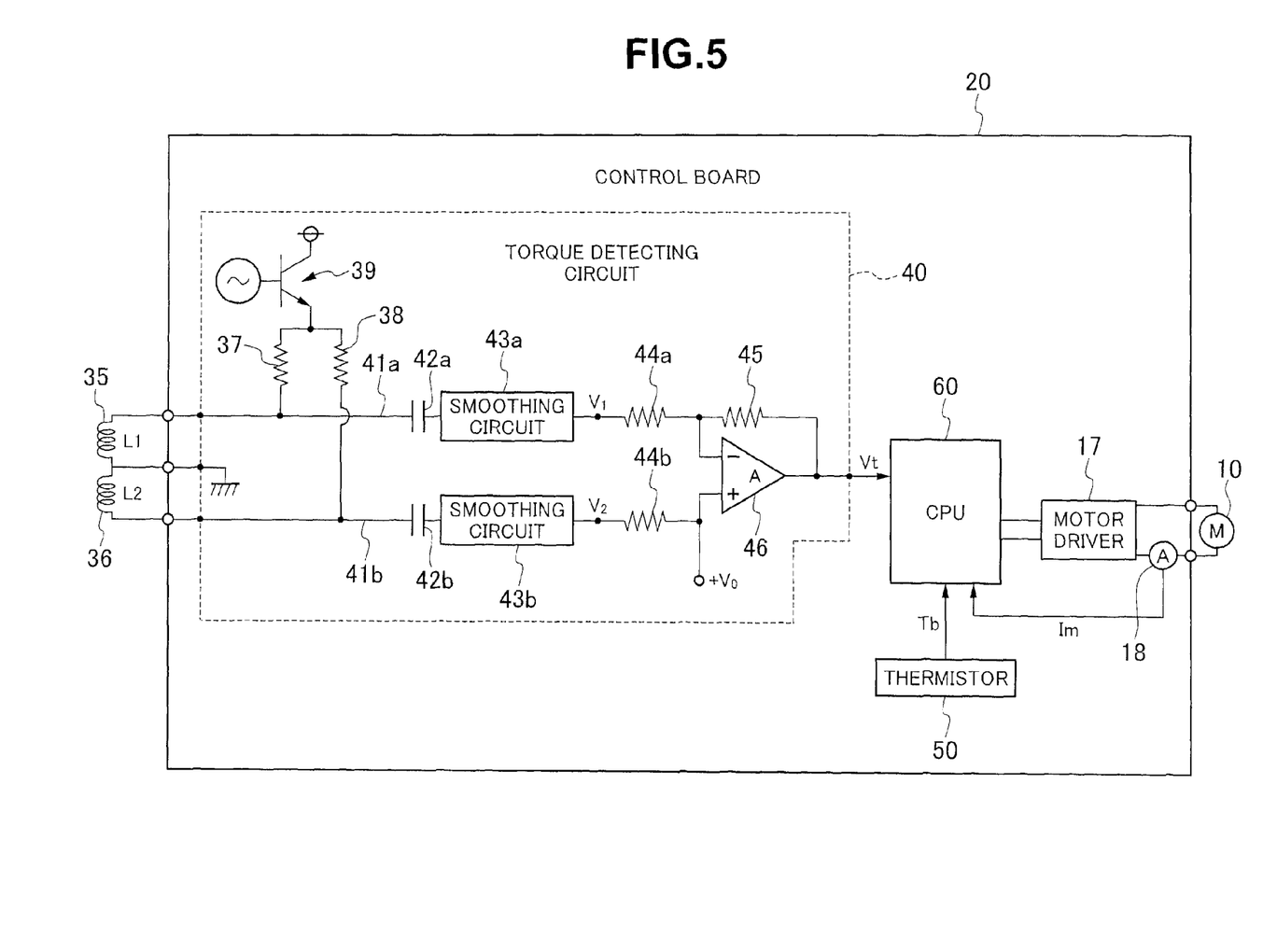
FIG. 5 is a schematic view of an outline structure of a control circuit controlling so as to drive a motor.

FIG. 5 shows a torque detection circuit 40 for detecting a torque based on changes in inductance L1, L2 of coils 35, 36 in this torque sensor 30.

Further, FIG. 5 is the schematic view of an outline structure of a control circuit controlling so as to drive the motor 10. The control circuit is constructed on the control board 20, and the torque detection circuit 40 comprises a part of the control circuit.

In the torque detection circuit 40, the coils 35, 36 are connected through each end, and signal lines from that connection terminal and the other ends are extended and connected to connecting terminals of a torque detection circuit 40.

In the torque detection circuit 40, the connecting terminal between the coils 35 and 36 is grounded while the other ends are connected to an emitter terminal of a transistor 39 through resistors 37, 38.

In the transistor 39, a constant voltage is applied to its collector terminal while AC voltage is inputted to its base terminal.

A voltage signal line 41a extended from a connecting portion between the coil 35 and the resistor 37 is connected to a smoothing circuit 43a through a capacitor 42a. A voltage signal line 41b extended from a connecting point between the coil 36 and the resistor 38 is connected to a smoothing circuit 43b through a capacitor 42b.

A bridge circuit is comprised of the coils 35, 36 and the resistors 37, 38, and an oscillation voltage is inputted to that bridge circuit. Output voltages from that circuit are inputted to the smoothing circuits 43a, 43b and smoothed and outputted as first and second voltages $V_1$, $V_2$.

The first and second voltages $V_1$, $V_2$ are inputted to an inversion input terminal and a non-inversion input terminal of a differential amplifier 46, which is an operational amplifier, through the resistors 44a, 44b.

Negative feedback is applied to the differential amplifier 46 by the resistor 45 so that it functions as a differential amplifier. Its output is inputted to CPU 60 as a torque detection voltage Vt.

Bias voltage $V_0$ is inputted to the non-inversion input terminal of the differential amplifier 46.

Therefore, the differential amplifier 46 amplifies a difference between the first voltage $V_1$ and the second voltage $V_2$ by A times, and outputs this plus the bias voltage $V_0$ as torque detection voltage Vt.

That is, the torque detection voltage Vt is $Vt=(V_2-V_1)\cdot A+V_0$.

A torque detection voltage Vt during neutral time which is not deflected to either right steering torque (torsion torque in the right direction), or left steering torque (torsion torque in the left direction) is called neutral point voltage and the aforementioned bias voltage $V_0$ at the normal time is the neutral point voltage.

This torque sensor 30 has the above-described schematic circuit structure. The operation thereof will be described with reference to FIGS. 6A and 6B showing behaviors of the first and second voltages $V_1$, $V_2$ and the torque detection voltage Vt.

Figure 6A:
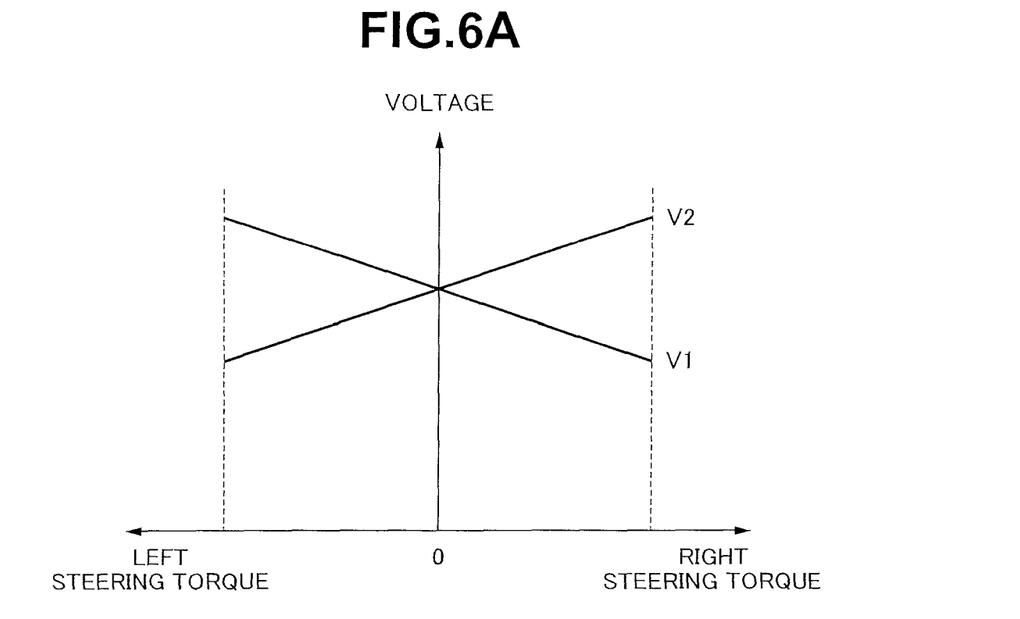
FIGS. 6A and 6b are views showing a state of first and second voltages and a torque detection voltage at a normal time.
Figure 6B:
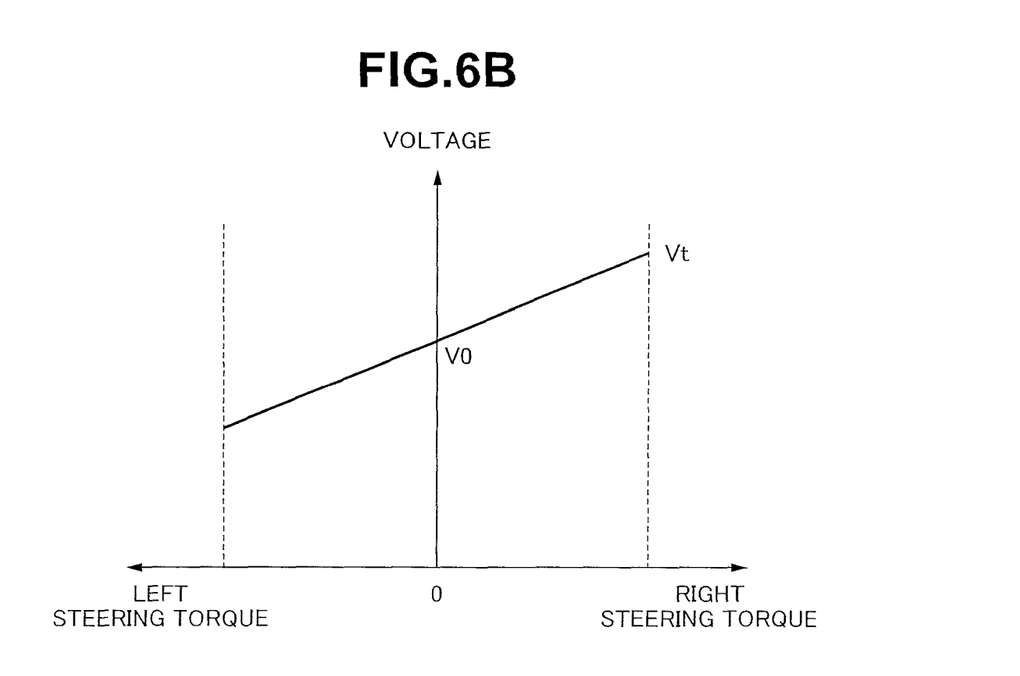

In coordinates shown in FIGS. 6A and 6B, its ordinate axis indicates voltage, rightward in the abscissa axis indicates right steering torque and leftward therein indicates left steering torque, while home position 0 indicates the neutral point.

FIGS. 6A and 6B show a condition in which the torque sensor 30 operates normally. When the right steering torque is increased, a core 35 moves toward the coil 33 due to a relative rotation between the input shaft 7 and the steering pinion shaft 9. Consequently, the inductance L2 of the coil 36 is increased so as to increase its induced electromotive force, and conversely the inductance L1 of the coil 35 is decreased so as to decrease induced electromotive force. As a result, the second voltage $V_2$ is increased while the first voltage $V_1$ is decreased (see FIG. 6A).

If the left steering torque is increased, conversely, the second voltage $V_2$ is decreased while the first voltage $V_1$ is increased (see FIG. 6A).

The torque detection voltage Vt, which is an output of the differential amplifier 46 gained by multiplying the difference between both by A times and then adding the bias voltage, is a rightward rising inclined line which passes the bias voltage $V_0$ at the neutral point shown in FIG. 6B.

The right and left steering torque can be detected according to the inclined line of the torque detection voltage Vt shown in FIG. 6B.

Figure 7:
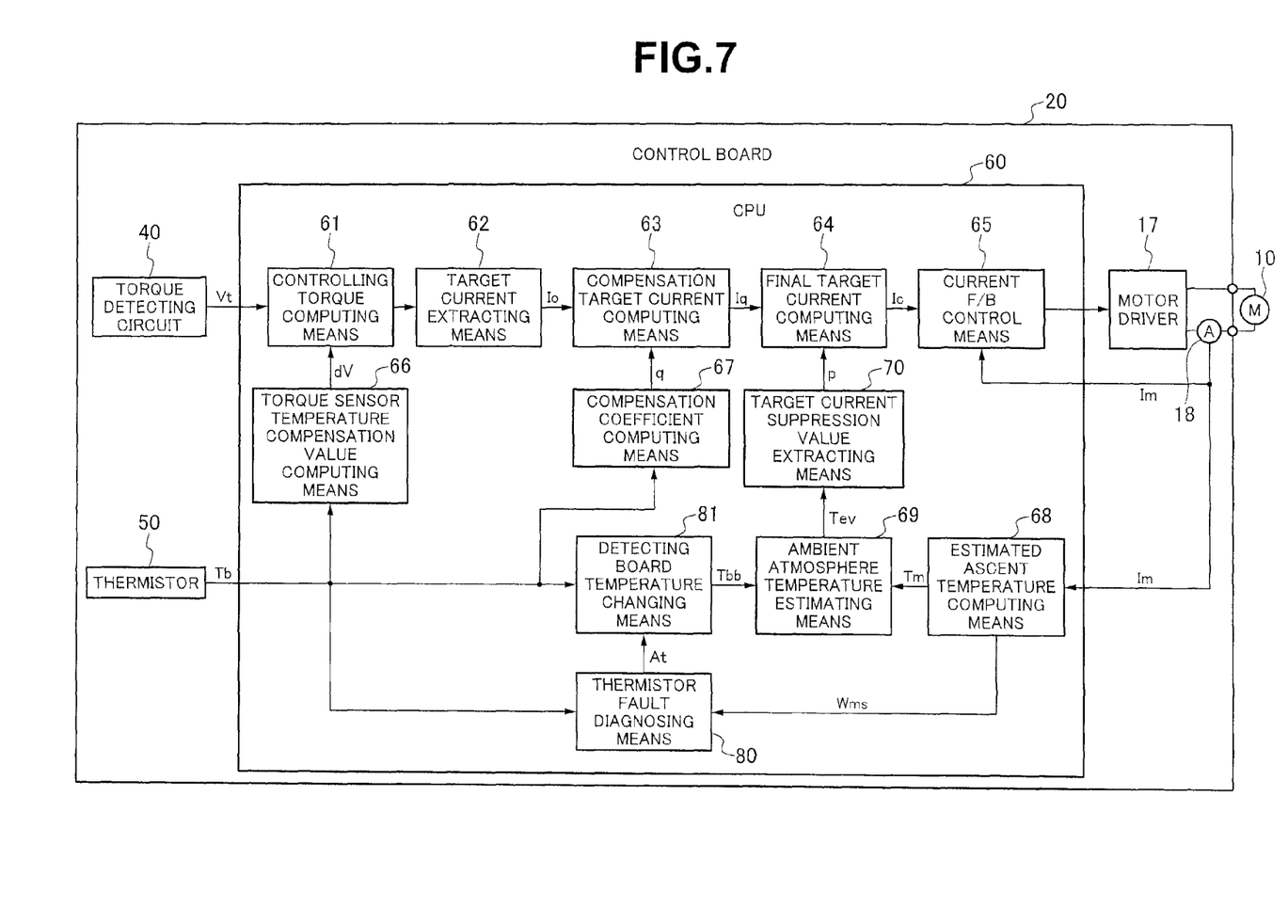
FIG. 7 is a block diagram showing a work of a CPU in a control circuit controlling so as to drive the motor by blocking per function.

As shown in FIG. 7, the torque detection voltage Vt is output to the CPU 60, and the CPU 60 outputs a command signal of the motor control in correspondence to the steering torque to the motor driver 17 on the basis of the torque detection voltage Vt, the motor 10 assisting the steering operation is driven by the motor driver 17, and the drive control of the motor 10 is executed in correspondence to the steering torque.

The motor driver 17 is structured, for example, such that four switching elements such as field effect transistors (FET) or the like are assembled in a bridge manner so as to be capable of supplying a DC chopper controlled current of a pulse width modulation type to the motor 10 in forward and backward both directions.

The various function elements such as the CPU 60, the motor driver 17, the torque detection circuit 40 and the like are mounted on the control board 20, and since there is a risk that these elements are thermally damaged if they are exposed to a high temperature equal to or higher than a certain temperature, a thermistor 50 is mounted to the control board 20, to detect the temperature of the control board 20.

In the control mechanism of the power steeling as mentioned above, an influence caused by the temperature of the torque sensor 30 is unavoidable.

Since the torque detection voltage Vt is determined on the basis of a voltage difference between the first voltage $V_1$ and the second voltage $V_2$, the temperature changes of the respective coils 35 and 36 themselves are cancelled so as to hardly affect the torque detection voltage Vt, however, the deflections caused by the thermal expansion of the structure parts such as the cores 33, the slider pin 34 and the like of the torque sensor 30, and the steering gear box 6 respectively have an effect independently on the first and second voltages $V_1$ and $V_2$. Accordingly, the torque detection voltage Vt is fluctuated and it is impossible to obtain an accurate torque.

Accordingly, since the temperature of the control board 20 is detected by utilizing the thermistor 50 mounted to the control board 20, and the thermistor 50 is provided within the housing 2b of the rack case 2, and exists in the torque sensor accommodating portion of the steering gear box 6 and the common space formed by the motor case 2a and the housing 2b of the rack case 2, the board temperature Tb detected by the thermistor 50 is output as an ambient atmosphere temperature of the common space to the CPU 60, and is supplied to a temperature compensation of the torque sensor 30, a temperature compensation of the generating torque of the motor 10 and a drive limit control of the motor 10 preventing the thermal damage of the control board 20.

The thermistor 50 employs an existing small-sized structure, and it is hardly necessary to enlarge the board size of the control board 20 at a time of being mounted to the control board 20.

Further, the temperature detection circuit obtained by combining the various function elements is not necessary, and it is possible to maintain the board size of the control board 20 small.

On the other hand, there is provided the current detecting apparatus 18 detecting the armature current value Im supplied to the motor 10 and flowing through the armature, the detection current value Im of the current detecting apparatus 18 is fed back to the CPU 60, and the ascended temperature caused by the heat generation of the motor 10 is estimated on the basis of the detection current value Im.

The torque detection voltage Vt by the torque detection circuit 40, the board temperature Tb by the therimstor 50 and the detection current value Im of the current detecting apparatus 18 are input to the CPU 60, and are processed by the CPU 60, there is executed the temperature compensation of the torque sensor 30 and the temperature compensation of the generation torque of the motor 10, and there is executed the drive control of the motor 10 preventing the thermal damage of the control board 20.

A block diagram showing the logical operation of the CPU 60 by function block is also illustrated in FIG. 7, and a description will be given below of the operation thereof.

The board temperature Tb detected by the thermistor 50 is input to the torque sensor temperature compensation value computing means 66 of the CPU 60, and the temperature compensation value dV for compensating the temperature of the torque sensor 30 is calculated by the torque sensor temperature compensation value computing means 66.

In other words, the board temperature Tb is assumed as the ambient atmosphere temperature of the torque sensor 30, and the temperature compensation value dV $(=(Tb-Ts)\cdot r)$ is obtained by multiplying the temperature change amount Tb−Ts of the board temperature Tb from the reference temperature Ts by the conversion coefficient r so as to convert into the voltage.

The temperature compensation value dV is input to the controlling torque computing means 61, and the controlling torque computing means 61 calculates the controlling torque Vt−dV by subtracting the temperature compensation value dV from the torque detection voltage Vt independently input from the torque detection circuit 40.

It is possible to detect an accurate controlling torque which is not affected by the temperature change (the thermal expansion of the case or the like) depending on the other constituting parts than the temperature change of the coil itself of the torque sensor 30, by using the board temperature Tb for compensating the torque detection voltage Vt as mentioned above.

The target current extracting means 62 extracts the target current Io driving the motor 10 on the basis of the controlling torque Vt−dV.

The target current extracting means 62 extracts the target current Io by comparing the determined controlling torque Vt−dV with the relation of the optimum target current Io with respect to the previously determined controlling torque and vehicle speed so as to output to the compensation target current computing means 63.

Further, since the control board 20 to which the thermistor 50 is mounted exists in the common space in adjacent to the motor 10, the board temperature Tb detected by the thermistor 50 can be approximately assumed as the ambient atmosphere temperature of the motor 10, and can be used for compensating the temperature of the generated torque of the motor 10.

Figure 8:
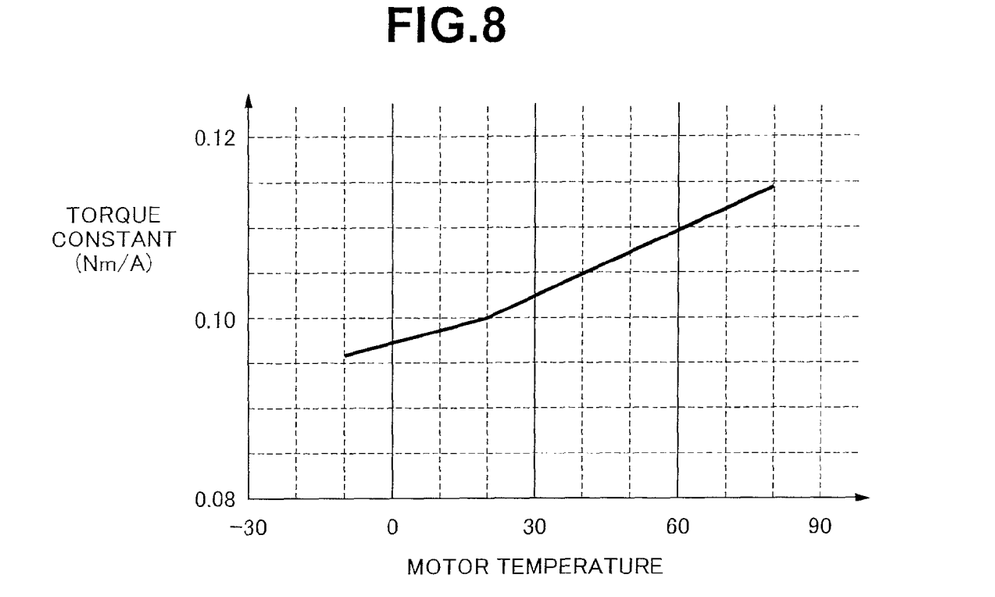
FIG. 8 is a view showing a temperature characteristic of a torque constant of the motor.

A torque constant (a ratio of the generation torque with respect to the armature current, Nm/A) of the motor 10 slightly fluctuates with respect to the temperature change, and an example thereof is shown in a graph in FIG. 8.

In the graph in FIG. 8, a torque constant (a vertical axis) shows an upward-sloping the chart with respect to the motor temperature (a horizontal axis).

Figure 9:
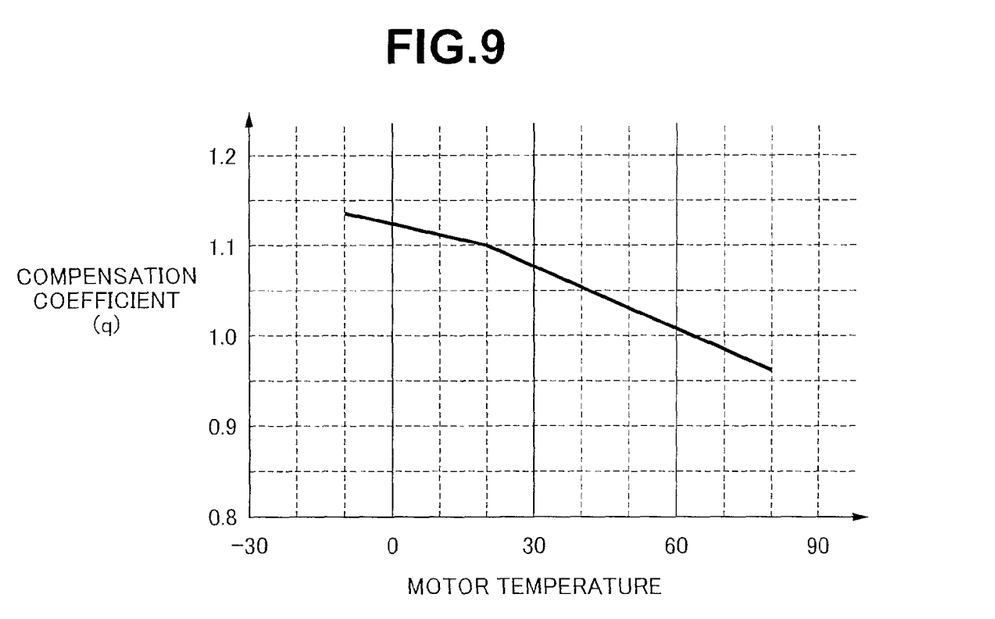
FIG. 9 is a view showing a relation of a correction coefficient with respect to the motor temperature.

Since the torque of the motor fluctuates with temperature on the basis of the temperature characteristic of the torque constant, a compensation coefficient q with respect to the temperature as shown by a graph in FIG. 9 is previously set and stored.

A graph of the compensation coefficient q in FIG. 9 is structured such that the compensation coefficient q forms a downward-sloping line chart with respect to the temperature in contradiction to the graph in FIG. 8, in order to keep the temperature change of the torque constant at a predetermined torque constant regardless of the temperature.

Accordingly, the board temperature Tb detected by the thermistor 50 and input to the compensation coefficient computing means 67, and the board temperature Tb is assumed as the motor temperature and is compared with the graph of the compensation coefficient q in FIG. 9 by the compensation coefficient computing means 67 so as to determine the compensation coefficient q corresponding to the temperature Tb.

The determined compensation coefficient q is input to the compensation target current computing means 63, and the compensation coefficient q is multiplied by the target current Io extracted by the target current extracting means 62, by the compensation target current computing means 63, whereby the compensation target current Iq (=Io·q) in which the generation torque of the motor 10 is temperature compensated.

The calculated compensation target current Iq is output to the final target current computing means 64.

Further, the board temperature Tb detected by the thermistor 50 is further input to a thermistor fault diagnosing means 80 and a board temperature changing means 81 mentioned below, and a change board temperature Tbb output from the board temperature changing means 81 is input to the ambient atmosphere temperature estimating means 69.

In this case, the change board temperature Tbb is not changed until the fault is diagnosed by the thermistor fault diagnosing means 80, but indicates the same value as the board temperature Tb, and a detail thereof will be mentioned below.

On the other hand, the armature current value Im supplied to the motor 10 detected by the current detecting apparatus 18 is input to the estimated ascent temperature computing means 68 of the CPU 60, and the estimated ascent temperature Tm caused by the heat generation of the motor 10 is computed on the basis of the armature current value Im.

A main loss of the motor at a time of operating is constituted by a copper loss, and the copper loss is obtained by multiplying a square of the armature current value Im by the armature resistance, and can be converted into a calorific power by dividing it by a specific heat resistance.

Accordingly, the estimated ascent temperature Tm can be computed by multiplying an integrated value of the square of the armature current value Im by the temperature conversion coefficient.

In other words, the estimated ascent temperature computing means 68 determines an integrated value Wms of the square of the armature current value Im on the basis of a repeated computation of Wms(n)=Wms(n−1)+(Im−Ima)$^2$, and calculates the estimated ascent temperature Tm= (=Wms·k) by multiplying it by the temperature conversion coefficient k.

In this case, Ima is a motor current integration reference value, Wms(n−1) is a preceding integrated value, and Wms(n) is this time integrated value.

The estimated ascent temperature Tm is input to the ambient atmosphere temperature estimating means 69.

The change board temperature Tbb output from the board temperature changing means 81 is independently to the ambient atmosphere temperature estimating means 69, and the ambient atmosphere temperature estimating means 69 adds the estimated ascent temperature Tm to the change board temperature Tbb (the board temperature Tb in the case that the thermistor 50 is normal) so as to estimate an ambient atmosphere temperature Tev (=Tbb+Tm) to which the common space of the steering gear box 6 and the rack case 2 is expected to come.

The ambient atmosphere temperature Tev estimated by the ambient atmosphere temperature estimating means 69 is input to the target current suppression value extracting means 70, and the target current suppression value p is extracted by the target current suppression value extracting means 70.

The target current suppression value extracting means 70 stores a corresponding relation previously determining the target current suppression value p suppressing the target current driving the motor so as to suppress the temperature ascent at a certain temperature or higher with respect to the ambient atmosphere temperature Tev, in such a manner as to prevent the control board 20 arranged within the housing 2b of the rack case 2 from being thermally damaged.

Figure 10:
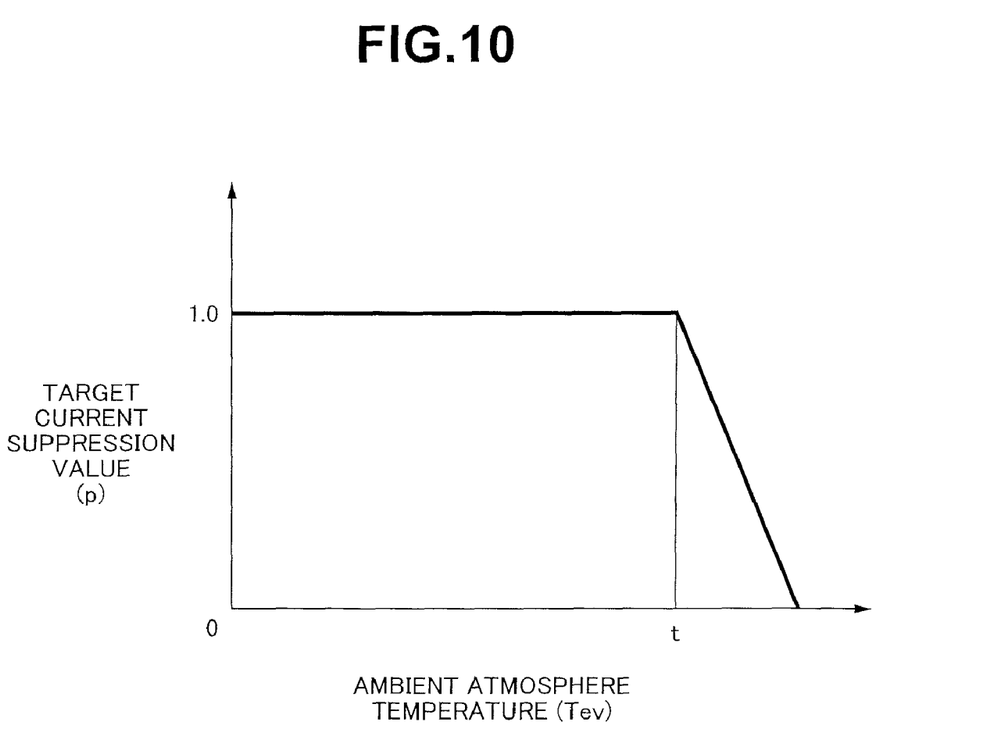
FIG. 10 is a view showing a correspondence relation of a target current suppression value with respect to an ambient atmosphere temperature.

The predetermined corresponding relation between the ambient atmosphere temperature Tev and the target current suppression value p is shown in FIG. 10.

The target current suppression value p is 1.0 until the ambient atmosphere temperature Tev comes to a certain suppression start temperature t.

If the ambient atmospheric temperature Tev becomes higher than the suppression start temperature t, the target current suppression value p is reduced little by little from 1.0.

The target current suppression value p extracted by the target current suppression value extracting means 70 on the basis of the ambient atmosphere temperature Tev is input to the final target current computing means 64, and is multiplied by the compensation target current Iq independently input to the final target current computing means 64 from the compensation current target current computing means 63, whereby a final target current Ic (=Iq·p) is calculated.

Accordingly, the target current suppression value p=1.0 is established until the estimated ambient atmosphere temperature Tev reaches the suppression start temperature t, and the compensation target current Iq is supplied as the final target current Ic to the motor drive without being suppressed at all. However, if the ambient atmosphere temperature Tev becomes higher than the suppression start temperature t, a rate suppressing the compensation target current Iq becomes enlarged in accordance with the reduction of the target current suppression value p, and the heat generation of the motor 10 can be suppressed, whereby it is possible to prevent the thermal damage of the control board 20 including the various function elements.

In this case, with regard to the motor 10 within the same common space as the control board 20, it is possible to prevent the burnout caused by the heat generation thereof.

If the compensation target current Iq is suppressed, the steering assist force generated by the motor 10 is reduced. Accordingly, the driver feels that the steering operation becomes heavy, however, since the target current suppression value p is reduced little by little and the compensation target current Iq is suppressed little by little at a time when the ambient atmosphere temperature Tev becomes higher than the suppression start temperature t, uncomfortable feelings are not transmitted to the driver.

In this case, the final target current Ic output by the final target current computing means 64 is input to the current feedback control means 65, and the current feedback control means 65 outputs a command signal for setting a difference from the final target current Ic to 0 to the motor driver 17 in response to the feedback of the armature current value Im from the current detecting apparatus 18, thereby executing a feedback control of the motor 10.

As mentioned above, the control board 20 executes the temperature compensation of the torque sensor 30 and the temperature compensation of the generated torque of the motor 10, and executes the drive control of the motor 10 for preventing the thermal damage of the control board 20.

The thermistor 50 provided in the control board 20 exists in the common space of the steering gear box 6 and the rack case 2, and the board temperature Tb detected by the thermistor 50 prevents thermal damage to the control board 20 and is assumed as the ambient atmosphere temperature of the torque sensor 30 so as to be used for compensating the temperature of the torque sensor 30.

In the present motor-driven power steering apparatus 1, it is further possible to obtain a stable generation torque of the motor 10 without being affected by the temperature, by utilizing the thermistor 50, assuming the board temperature Tb as the ambient atmosphere temperature of the motor 10 and executing the temperature compensation of the torque generation of the motor 10.

The above is an effect in the case that the thermistor 50 is normally operated, however, in the case that the thermistor 50 is out of order, not only the effect mentioned above can not be expected, but also there is a risk that the suppression of the target current by the target current suppression value extracting means 70 does not work due to the erroneous board temperature Tb, and the control board 20 and the motor 10 are thermally damaged. However, the present motor-driven power steering apparatus 1 is provided with a function of coping with the fault of the thermistor 50.

Accordingly, there is first provided with a thermistor fault diagnosing means 80 executing a fault diagnosis of the thermistor 50.

The board temperature Tb detected by the thermistor 50, and the integrated value of the square of the armature current value Im calculated in the computing process in the estimated ascent temperature computing means 68 are input to the thermistor fault diagnosing means 80, and the fault diagnosis of the thermistor 50 is executed on the basis of the board temperature Tb and the current square integrated value Wms.

Figure 11:
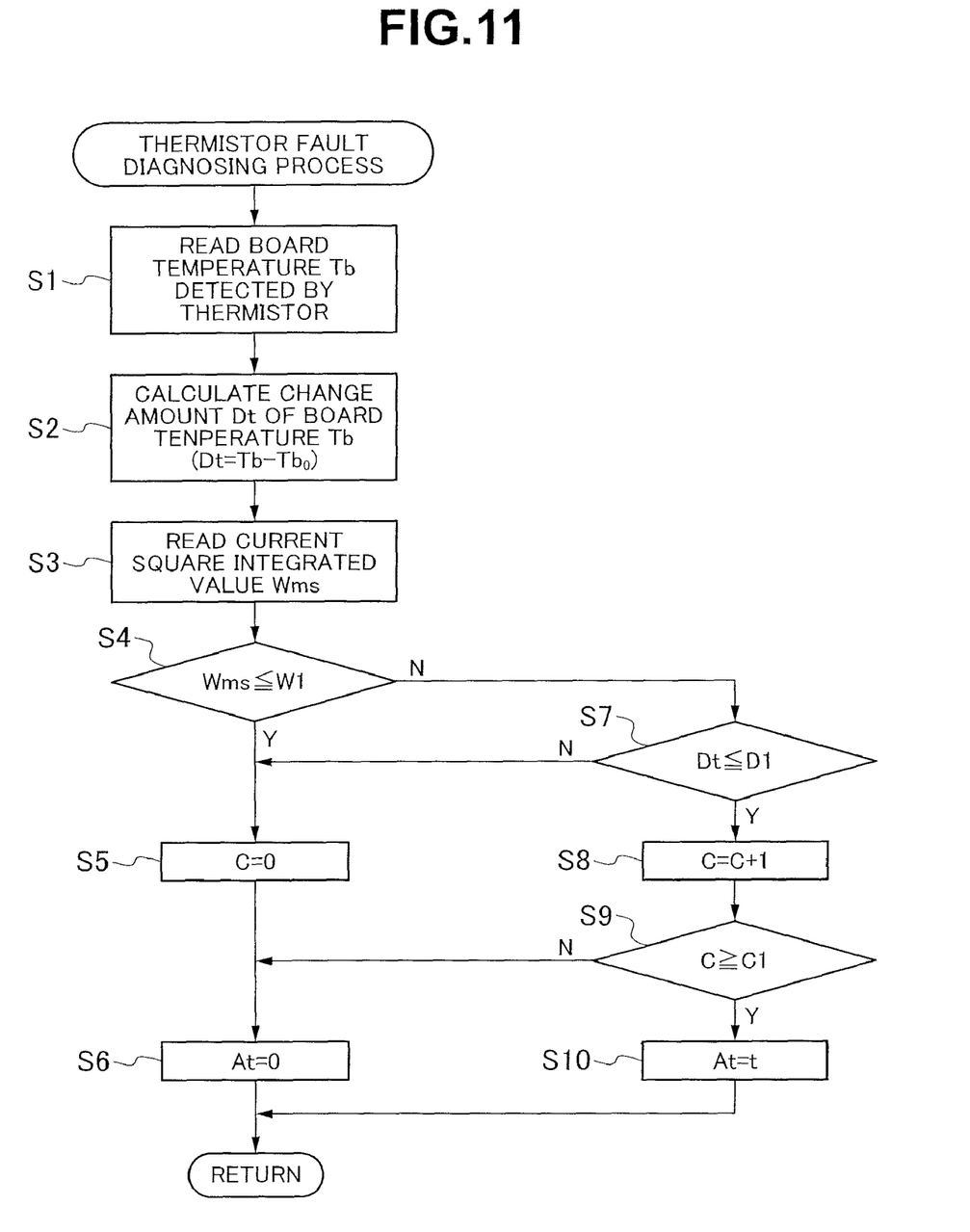
FIG. 11 is a flow chart showing a procedure of a fault diagnosing process of a thermistor.

A procedure of the fault diagnosing process of the thermistor 50 by the thermistor fault diagnosing means 80 is shown in FIG. 11 by a flow chart and will be described.

First, the board temperature Tb detected by the thermistor 50 is read (a step 1), and the next step 2 calculates a change amount Dt of the board temperature Tb.

The change amount Dt of the board temperature Tb corresponds to a change amount from the board temperature Tbo on the basis of the board temperature Tbo at a time of starting the control board 20.

In other words, the amount obtained by subtracting the board temperature Tbo at a time of starting the control board 20 from the read current board temperature Tb is set to the change amount Dt (=Tb−Tbo) of the board temperature Tb.

Next, the step reads the current square integrated value Wms (a step 3).

Further, step 4 determines whether or not the read current square integrated value Wms is equal to or less than a predetermined integrated value W1.

The greater the current square integrated value Wms is, the higher the estimated ascent temperature expected to be ascended in the common space of the steering gear box 6 and the rack case 2 is. Accordingly, it is possessed that the board temperature Tb detected by the thermistor 50 ascends largely in a following manner.

A predetermined integrated value W1 at such a level as to be capable of securely evaluating the operation of the thermistor 50 is previously set.

Accordingly, if the current square integrated value Wms is equal to or less than the predetermined integrated value W1, the step goes to a step 5 without entering into the fault diagnosis of the thermistor 50, however, if the current square integrated value Wms is higher than the predetermined integrated value W1, it is possible to securely evaluate the operation of the thermistor 50. Accordingly, the step enters into the fault diagnosis of the thermistor 50 and jumps to a step 7.

If the step goes to the step 5 without entering into the fault diagnosis of the thermistor 50, a count value C of a counter is cleared (to 0), a change amount At of the detection substrate temperature Tb is set to 0 (a step 6), and the step goes back to the step 1.

As far as the current square integrated value Wms is equal to or less than the predetermined integrated value W1, the fault diagnosis can not be executed, and the steps 1, 2, 3, 4, 5 and 6 are repeated.

Further, if the current square integrated value Wms becomes higher than the predetermined value W1, the step jumps to the step 7 form the step 4 so as to enter into the fault diagnosis, and determines whether or not the change amount Dt of the board temperature Tb is equal to or lower than the predetermined change amount D1.

If the current square integrated value Wms becomes higher than the predetermined value W1, the board temperature Tb is increased in a following manner as far as the thermistor 50 is normal, and if the change amount Dt becomes higher than the predetermined value D1 and the thermistor 50 is out of order and abnormal, such a predetermined amount D1 that the change amount Dt does not reach the predetermined amount D1 as previously set.

Accordingly, if the step 7 determines that the change amount Dt of the board temperature Tb is larger than the predetermined change amount D1, the thermistor 50 is normal, and the step goes to the step 5, however, if the step determines that the change amount Dt is equal to or less than the predetermined change amount D1, there is a possibility that the thermistor 50 is out of order, and the step goes to a step 8.

If the step determines that the thermistor 50 has a chance of being out of order and goes to the step 8, the step increments the count value C of the counter (C=C+1).

Further, the next step 9 determines whether or not the count value C is equal to more than a predetermined value C1.

If the count value C does not reach the predetermined value C1, the step jumps to the step 6, and sets a change amount At of the board temperature Tb to 0 so as to return to the step 1. Accordingly, as far as the step 4 determines that the current square integrated value Wms is more than the predetermined integrated value W1, and the step 7 determines that the thermistor 50 has a change of being out of order, the steps 1, 2, 3, 4, 7, 8, 9 and 6 are repeated at first and the count value C is increased each time in the step 8, and if the count value C reaches the predetermined value C1, the step determines that the thermistor 50 is out of order, and the step goes to a step 10 from the step 9 so as to set the change amount At of the board temperature Tb to the suppression start temperature t (At=t), and returns to the step 1.

In other words, the counter serves as a timer, the count value C expresses an elapsed time, and the step does not determine that the thermistor 50 is out of order until the time for which the thermistor 50 has a change of being out of order reaches the predetermined time (the predetermined value C1), but determines that the thermistor 50 is out of order for the first time at a time when the predetermined time (the predetermined value C1) has passed, thereby securely preventing an erroneous diagnosis by setting the change amount At of the board temperature Tb to the suppression start temperature t.

As mentioned above, in the case that the thermistor fault diagnosing means 80 diagnoses the fault of the thermistor 50, and diagnoses that the thermistor 50 is not out of order, the thermistor fault diagnosing means 80 sets the change amount At of the board temperature Tb to 0, and in the case that it diagnoses that the thermistor 50 is out of order, it sets the change amount At of the board temperature Tb to t, and outputs the change amount At to the board temperature changing means 81.

The board temperature changing means 81 inputs the change amount At so as to add the change amount At to the board temperature Tb detected by the thermistor 50 and calculates the change board temperature Tbb (=Tb+At), and outputs to the ambient atmosphere temperature estimating means 69.

In other words, in the case that it is determined that the thermistor 50 is not out of order, the change board temperature Tbb is not changed since the change amount At is 0, and the change board temperature Tbb (=Tb+0) is the board temperature Tb detected by the thermistor 50 itself, and in the case that it is determined that the thermistor 50 is out of order, the change amount At is t, and the change board temperature Tbb (=Tb+t) comes to a higher temperature in which the board temperature Tb is changed at t.

Accordingly, the ambient atmosphere temperature estimating means 69 adds the estimated ascent temperature Tm to the change board temperature Tbb so as to estimate the ambient atmosphere temperature Tev (=Tbb+Tm), however, in the case that it is determined that the thermistor 50 is out of order, the ambient atmosphere temperature Tev=Tb+t+Tm is established, and the ambient atmosphere temperature comes to a temperature which is larger than the normal suppression start temperature t.

If the ambient atmosphere temperature Tev is input to the target current suppression value extracting means 70, the ambient atmosphere temperature Tev comes to the temperature which is higher than the suppression start temperature t in the case that it is determined that the thermistor 50 is out of order, with reference to FIG. 10, so that the target current suppression value p is a value which is smaller than 1.0, and 0 is extracted in some cases.

Accordingly, in the case that it is determined that the thermistor 50 is out of order, the compensation target current Iq is multiplied by the target current suppression value p which is smaller than 1.0 or 0, in the final target current computing means 64. Accordingly, since the final target current Ic (=Iq·p) is suppressed or comes to 0, and the driving of the motor 10 is suppressed and the heat generation of the motor 10 is suppressed, it is possible to securely prevent the burnout of the motor 10 and the thermal damage of the control board 20 including various function elements even at a time when the thermistor 50 is out of order and can not detect the board temperature Tb in spite that the actual board temperature is considerably high.

In this case, when it is determined that the thermistor 50 is out of order, the process mentioned above is executed, and a warning is given to the driver by a flash of the lamp or the like.

Further, the structure may be made such as to directly output the board temperature Tb detected by the thermistor 50 to the ambient atmosphere temperature estimating means 69, except the board temperature changing means 81 in the CPU 60, and directly suppress the final target current Ic corresponding to the output of the final target current computing means 64 (or set it to 0) at a time when the result of diagnosis of the thermistor fault detection diagnosing means 80 is diagnosed as the fault of the thermistor 50.

In accordance with the motor-driven power steering apparatus described in the first aspect, since the fault diagnosing means diagnoses the fault of ht board temperature detecting apparatus on the basis of the detected armature current and the temperature of the control board, and suppresses the target current at a time of diagnosing the fault, the drive of the motor is suppressed and it is possible to securely prevent the thermal damage of the motor and the motor drive circuit.

In this case, the suppression of the target current includes setting the target current to 0 so as to stop the drive of the motor.

In accordance with the motor-driven power steering apparatus described in the second aspect, since there is provided the compensation computing means compensating the target current calculated by the target current computing means by the board temperature detected by the board temperature detecting apparatus, and the target current suppressing means suppresses the target current compensated by the compensation computing means, it is possible to diagnose the fault of the board temperature detecting apparatus while removing the influence given by the temperature of the torque of the motor and executing the precise assist control, thereby preventing the thermal damage of the motor and the motor drive circuit.

In accordance with the motor-driven power steering apparatus described in the third aspect, the integrated value of the square of the armature current can estimate the ascent temperature in proportion to the calorific power of the motor, however, in the case that the state in which the change amount of the detection temperature is equal to or less than the predetermined value carries over for a predetermined time in spite that the integrated value of the square of the armature current is more than the predetermined value and the temperature ascent can be estimated, it is possible to easily diagnose that the board temperature detecting apparatus is out of order.

In accordance with the motor-driven power steering apparatus described in the fourth aspect, since the detection temperature of the control board constituting the ambient atmosphere temperature suppressing the compensation target current is forcibly changed to the higher temperature at a time when the board temperature detecting apparatus is diagnosed to be out of order, the suppression of the compensated target current is intensified, the drive of the motor is further suppressed, and it is possible to securely prevent the thermal damage of the motor and the motor drive circuit.

In accordance with the motor-driven power steering apparatus described in the fifth aspect, it is possible to simply detect the temperature of the control board without enlarging the board size, on the basis of the provision of the small-sized thermistor in the control board.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A motor-driven power steering apparatus comprising;
   a rack shaft accommodated movably within a rack case, being moved by a steering force applied to a steering wheel, and also being moved by a driving force of a motor to assist the steering force,
   an input shaft coupled to a steering wheel, being rotatably supported in a steering gear box, being coupled to a pinion shaft via a torsion bar within the steering gear box, and tooth of the pinion shaft engaged with tooth of the rack shaft,
   a torque sensor provided around the torsion bar within the steering gear box,
   a target current computing means calculating a target current on the basis of a steering torque detected by the torque sensor, to control the motor to assist the steering force in accordance with the target current;
   a board temperature detecting apparatus provided on a control board, detecting a board temperature of the control board;
   a motor current detecting means detecting an armature current of the motor;
   a fault diagnosing means diagnosing a fault of the board temperature detecting apparatus on the basis of the armature current detected by the motor current detecting means and the board temperature detected by the board temperature detecting apparatus;
   a target current suppressing means suppressing the target current at a time when the fault diagnosing means diagnoses that the board temperature detecting apparatus is out of order, and
   a CPU provided on the control board;
   wherein the board temperature detecting apparatus is provided within a housing of the rack case, and exists in a common space formed by a torque sensor accommodating portion of the steering gear box and a motor case and the housing of the rack case,
   the board temperature detected by the board temperature detecting apparatus is output to the CPU as an ambient atmosphere temperature of the common space, and using this output, the CPU supplies a temperature compensation of the torque sensor and a temperature compensation of a
   generating torque of the motor, and preventing thermal damage of the control board.

2. A motor-driven power steering apparatus as claimed in claim 1, wherein the motor-driven power steering apparatus is provided with a compensation target current computing means compensating the target current calculated by the target current computing means on the basis of the board temperature detected by the board temperature detecting apparatus, and
   wherein the target current suppressing means suppresses the target current compensated by the compensation target current computing means.

3. A motor-driven power steering apparatus as claimed in claim 2, wherein the fault diagnosing means diagnoses that the board temperature detecting apparatus is out of order, in the case that an integrated value of a square of the armature current detected by the motor current detecting means is more than a predetermined value, and a state in which a change amount of the board temperature is equal to or less than a predetermined value over for a predetermined time.

4. A motor-driven power steering apparatus as claimed in claim 3, wherein the target current suppressing means computes an estimated ascent temperature on the basis of an integrated value of a square of the armature current detected by the motor current detecting means, and suppresses the target current on the basis of an ambient atmosphere temperature obtained by adding the estimated ascent temperature to the board temperature detected by the board temperature detecting apparatus, and
   wherein the board temperature is forcibly changed to a higher temperature at a time when the fault diagnosing means diagnoses that the board temperature detecting apparatus is out of order.

5. A motor-driven power steering apparatus as claimed in claim 3, wherein the motor-driven power steering apparatus has a torque sensor temperature compensation value computing means computing a temperature compensation value for compensating a temperature of a torque sensor by being input the board temperature, and
   wherein the motor-drive power steering apparatus has a controlling torque computing means to which the temperature compensation value is input, and calculating a controlling torque by subtracting the temperature compensation value from a torque detection voltage independently input from a torque detection circuit.

6. A motor-driven power steering apparatus as claimed in claim 5, wherein the motor-driven power steering apparatus has a target current extracting means extracting a target current driving the motor by comparing the determined controlling torque with a relation of an optimum target current with respect to a previously determined controlling torque and vehicle speed, on the basis of the controlling torque, and outputting to the compensation target current computing means.

7. A motor-driven power steering apparatus as claimed in claim 3, wherein the board temperature detecting apparatus is constituted by a thermistor provided in the control board.

8. A motor-driven power steering apparatus as claimed in claim 7, wherein the control board to which the thermistor is mounted is provided in the common space with the motor, adjacent to the motor.

9. A motor-driven power steering apparatus as claimed in claim 2, wherein the target current suppressing means computes an estimated ascent temperature on the basis of an integrated value of a square of the armature current detected by the motor current detecting means, and suppresses the target current on the basis of an ambient atmosphere temperature obtained by adding the estimated ascent temperature to the board temperature detected by the board temperature detecting apparatus, and wherein the board temperature is forcibly changed to a higher temperature at a time when the fault diagnosing means diagnoses that the board temperature detecting apparatus is out of order.

10. A motor-driven power steering apparatus as claimed in claim 2, wherein the motor-driven power steering apparatus has a torque sensor temperature compensation value computing means computing a temperature compensation value for compensating a temperature of a torque sensor by being input the board temperature, and wherein the motor-drive power steering apparatus has a controlling torque computing means to which the temperature compensation value is input, and calculating a controlling torque by subtracting the temperature compensation value from a torque detection voltage independently input from a torque detection circuit.

11. A motor-driven power steering apparatus as claimed in claim 10, wherein the motor-driven power steering apparatus has a target current extracting means extracting a target current driving the motor by comparing the determined controlling torque with a relation of an optimum target current with respect to a previously determined controlling torque and vehicle speed, on the basis of the controlling torque, and outputting to the compensation target current computing means.

12. A motor-driven power steering apparatus as claimed in claim 2, wherein the board temperature detecting apparatus is constituted by a thermistor provided in the control board.

13. A motor-driven power steering apparatus as claimed in claim 12, wherein the control board to which the thermistor is mounted is provided in the common space with the motor, adjacent to the motor.

14. A motor-driven power steering apparatus as claimed in claim 1, wherein the fault diagnosing means diagnoses that the board temperature detecting apparatus is out of order, in the case that an integrated value of a square of the armature current detected by the motor current detecting means is more than a predetermined value, and a state in which a change amount of the board temperature is equal to or less than a predetermined value over for a predetermined time.

15. A motor-driven power steering apparatus as claimed in claim 14, wherein the target current suppressing means computes an estimated ascent temperature on the basis of an integrated value of a square of the armature current detected by the motor current detecting means, and suppresses the target current on the basis of an ambient atmosphere temperature obtained by adding the estimated ascent temperature to the board temperature detected by the board temperature detecting apparatus, and wherein the board temperature is forcibly changed to a higher temperature at a time when the fault diagnosing means diagnoses that the board temperature detecting apparatus is out of order.

16. A motor-driven power steering apparatus as claimed in claim 14, wherein the motor-driven power steering apparatus has a torque sensor temperature compensation value computing means computing a temperature compensation value for compensating a temperature of a torque sensor by being input the board temperature, and wherein the motor-drive power steering apparatus has a controlling torque computing means to which the temperature compensation value is input, and calculating a controlling torque by subtracting the temperature compensation value from a torque detection voltage independently input from a torque detection circuit.

17. A motor-driven power steering apparatus as claimed in claim 16, wherein the motor-driven power steering apparatus has a target current extracting means extracting a target current driving the motor by comparing the determined controlling torque with a relation of an optimum target current with respect to a previously determined controlling torque and vehicle speed, on the basis of the controlling torque, and outputting to a compensation target current computing means.

18. A motor-driven power steering apparatus as claimed in claim 14, wherein the board temperature detecting apparatus is constituted by a thermistor provided in the control board.

19. A motor-driven power steering apparatus as claimed in claim 18, wherein the control board to which the thermistor is mounted is provided in the common space with the motor, adjacent to the motor.

20. A motor-driven power steering apparatus as claimed in claim 1, wherein the target current suppressing means computes an estimated ascent temperature on the basis of an integrated value of a square of the armature current detected by the motor current detecting means, and suppresses the target current on the basis of an ambient atmosphere temperature obtained by adding the estimated ascent temperature to the board temperature detected by the board temperature detecting apparatus, and wherein the board temperature is forcibly changed to a higher temperature at a time when the fault diagnosing means diagnoses that the board temperature detecting apparatus is out of order.

21. A motor-driven power steering apparatus as claimed in claim 1, wherein the motor-driven power steering apparatus has a torque sensor temperature compensation value computing means computing a temperature compensation value for compensating a temperature of a torque sensor by being input the board temperature, and wherein the motor-drive power steering apparatus has a controlling torque computing means to which the temperature compensation value is input, and calculating a controlling torque by subtracting the temperature compensation value from a torque detection voltage independently input from a torque detection circuit.

22. A motor-driven power steering apparatus as claimed in claim 21, wherein the motor-driven power steering apparatus has a target current extracting means extracting a target current driving the motor by comparing the determined controlling torque with a relation of an optimum target current with respect to a previously determined controlling torque and vehicle speed, on the basis of the controlling torque, and outputting to a compensation target current computing means.

23. A motor-driven power steering apparatus as claimed in claim 1, wherein the board temperature detecting apparatus is constituted by a thermistor provided in the control board.

24. A motor-driven power steering apparatus as claimed in claim 23, wherein the control board to which the thermistor is mounted is provided in the common space with the motor, adjacent to the motor.

* * * * *